(12) United States Patent
Maier et al.

(10) Patent No.: US 11,830,396 B2
(45) Date of Patent: Nov. 28, 2023

(54) DISPLAY APPARATUS

(71) Applicant: TriLite Technologies GmbH, Vienna (AT)

(72) Inventors: Franz Josef Maier, Poertschach am Woerthersee (AT); Manuel Dorfmeister, Wiesen (AT); Joerg Reitterer, Brunn am Gebirge (AT); Louahab Noui, East Sussex (GB)

(73) Assignee: TriLite Technologies GmbH, Vienna (AT)

( * ) Notice: Subject to any disclaimer, the term of this patent is extended or adjusted under 35 U.S.C. 154(b) by 0 days.

(21) Appl. No.: 17/954,992

(22) Filed: Sep. 28, 2022

(65) Prior Publication Data
US 2023/0116084 A1 Apr. 13, 2023

(30) Foreign Application Priority Data

Oct. 13, 2021 (EP) .................................. 21 202 486
Dec. 22, 2021 (EP) .................................. 21 216 944

(51) Int. Cl.
*G09G 3/02* (2006.01)
*G02B 26/08* (2006.01)
(Continued)

(52) U.S. Cl.
CPC .............. *G09G 3/02* (2013.01); *G02B 26/085* (2013.01); *G02B 26/105* (2013.01); *G02B 27/0172* (2013.01); *G02B 27/0179* (2013.01); *G06F 3/012* (2013.01); *G06F 3/013* (2013.01); *G06T 15/005* (2013.01); *G06T 19/006* (2013.01);
(Continued)

(58) Field of Classification Search
CPC ............ G09G 3/02; G09G 2320/0233; G09G 2320/0247; G09G 2340/0407; G09G 2354/00; G09G 2360/18; G02B 26/085; G02B 26/105; G02B 27/0172;
(Continued)

(56) References Cited

U.S. PATENT DOCUMENTS 9,986,215 B1\* 5/2018 Tardif ................... H04N 9/3188
2013/0222774 A1 8/2013 Chikaoka
(Continued)

OTHER PUBLICATIONS

European Patent Office Search Report on Application No. 21202486.3, dated Mar. 18, 2022.
(Continued)

*Primary Examiner* — Dmitriy Bolotin
(74) *Attorney, Agent, or Firm* — Hoffmann & Baron, LLP (57) ABSTRACT

A display apparatus comprises a mirror oscillating about a first axis upon excitation by a first excitation signal and about a second axis upon excitation by a second excitation signal, a light source projecting a light beam onto the mirror for deflection towards an image plane, the light source being controller according to pixels read-out by an image processor from a buffer, a gaze tracker detecting a user's region of interest, ROI, within the image plane, and a controller modulating one of the excitation signals by a modulation signal which is dependent on the ROI such that the number of passes of the light beam per unit area is higher in the ROI than in a region outside thereof, wherein the number of pixels read-out per unit area by the image processor is higher in the ROI than in a region outside of the ROI.

19 Claims, 6 Drawing Sheets

(51) Int. Cl.
*G02B 26/10* (2006.01)
*G02B 27/01* (2006.01)
*G06F 3/01* (2006.01)
*G06T 15/00* (2011.01)
*G06T 19/00* (2011.01)

(52) U.S. Cl.
CPC .......... *G02B 2027/014* (2013.01); *G02B 2027/0178* (2013.01); *G02B 2027/0187* (2013.01); *G09G 2320/0233* (2013.01); *G09G 2320/0247* (2013.01); *G09G 2340/0407* (2013.01); *G09G 2354/00* (2013.01); *G09G 2360/18* (2013.01)

(58) Field of Classification Search
CPC .......... G02B 27/0179; G02B 2027/014; G02B 2027/0178; G02B 2027/0187; G06F 3/013
See application file for complete search history.

(56) References Cited

U.S. PATENT DOCUMENTS

| | | |
|---|---|---|
| 2016/0328884 A1 | 11/2016 | Schowengerdt et al. |
| 2017/0188021 A1 | 6/2017 | Lo et al. |
| 2017/0285735 A1* | 10/2017 | Young .................. G06F 3/013 |
| 2018/0008141 A1* | 1/2018 | Krueger ................ A61B 3/0025 |
| 2018/0252913 A1 | 9/2018 | Tardif et al. |
| 2018/0286320 A1* | 10/2018 | Tardif .................. G02B 26/101 |
| 2018/0295331 A1* | 10/2018 | Tardif .................. H04N 9/3164 |
| 2019/0279546 A1* | 9/2019 | Peuhkurinen .......... G02B 26/10 |
| 2019/0373140 A1* | 12/2019 | Gudaitis ................ G09G 3/346 |

OTHER PUBLICATIONS

European Patent Office Search Report on Application No. 21216944.5, dated Jun. 10, 2022.
European Search Report corresponding to Application No. 22179925.7-1020, dated Dec. 21, 2022.

* cited by examiner

DISPLAY APPARATUS

CROSS-REFERENCE TO RELATED APPLICATIONS

This application claims priority to the European Patent Applications No. 21 202 486.3 filed Oct. 13, 2021 and No. 21 216 944.5 filed Dec. 22, 2021, the disclosures of which are incorporated herein by reference.

TECHNICAL FIELD

The present disclosed subject matter relates to a display apparatus comprising a mirror assembly, wherein a first mirror of the mirror assembly is configured to oscillate about a first axis upon excitation by a first excitation signal of a first frequency and wherein the first or a second mirror of the mirror assembly is configured to oscillate about a second axis upon excitation by a second excitation signal of a second frequency, and a light source configured to project a light beam onto the mirror assembly for deflection by the mirror assembly towards an image plane, the light source having an input via which it can be controlled according to pixels of an image frame to be displayed on the image plane for a frame period, the pixels being read-out by an image processor from a buffer storing the image frame and applied sequentially to the input of the light source.

BACKGROUND

Display apparatus of this kind are commonly used in virtual reality (VR) or augmented reality (AR) glasses, helmets or head-up displays (HUDs) for a broad range of applications like navigation, training, entertainment, education or work. A light source emits a mono- or multicoloured light beam carrying an image comprised of pixels onto a moving micro-electro-mechanical-system (MEMS) mirror which deflects the light beam into subsequent directions (angles), one direction (angle) per pixel of the image. In raster scanning, the mirror oscillates fast about a vertical axis and slowly about a horizontal axis to sweep the directions and, thus, scan the light beam over the pixels of the image plane row by row and line by line. For the fast axis oscillation, the mirror can be driven in resonance with the natural harmonics of its articulation. However, for the slow sweep about its other axis the mirror needs to be forcedly driven against its resonance frequency, which either requires more power and a larger drive system or limits the scanning speed and hence the frame rate of the display.

To overcome these miniaturisation and speed limits of raster scanning, in so-called Lissajous scanning the mirror oscillates resonantly—or near resonance—about both axes. The frequencies of oscillation about the two axes are greater than the frame rate and the beginnings of their respective oscillation periods meet only every one or more frames. In this way, each frame (image) is "painted" with a very complex, "dense" Lissajous trajectory.

With Lissajous scanning, higher speeds of the light beam along its Lissajous trajectory and hence higher frame rates can be achieved with low driving powers and small actuators because of exploiting the resonance of the MEMS mirror. However, Lissajous scanners suffer from an uneven pixel resolution over the image for two reasons. Firstly, due to the sinusoidal oscillation of the mirror about each of its two axes the light beam moves fast in the middle and slowly at the periphery of the image plane. Secondly, due to the non-uniform pattern or "distribution" of the Lissajous trajectory of the light beam across the image plane each unit area of the image plane may be passed by the light beam once, twice or more per image frame. These effects usually lead to a high local density of the trajectory in the periphery of the image plane and a low local density of the trajectory in the middle. The lowest local density of the trajectory in the entire image, however, generally limits the pixel resolution of the display, as at least one light beam pass per pixel area is necessary to display a pixel of the image.

BRIEF SUMMARY

It is an object of the disclosed subject matter to provide a display apparatus with increased pixel resolution.

This object is achieved with a display apparatus of the aforementioned type, which is distinguished by a gaze tracker configured to detect a user's region of interest, ROI, within the image plane by tracking a user's gaze, and a controller connected to the gaze tracker and configured to modulate one of the first and second excitation signals by a first modulation signal which is dependent on the ROI detected by the gaze tracker such that the number of passes of the light beam per unit area of the image plane and per frame period is higher in the ROI than in a region outside of the ROI, wherein the image processor is connected to at least one of the gaze tracker and the controller and configured to control the number of pixels read-out per unit area and per frame period such that said number of pixels is higher in the ROI than in a region outside of the ROI. By modulating (at least) one of the excitation signals of the oscillating (at least one) mirror the shape of the Lissajous trajectory drawn by the light beam on the image plane is changed over time which, in turn, changes the local density of the beam trajectory, i.e. the number of (differing) passes each unit area of the image plane is hit by the light beam within a specific time period, e.g., during the period of display (i.e., the inverse of the frame rate) of one image frame of a series of image frames. Image regions with increased local density of the beam trajectory can then be used to display more pixels of a high-resolution image there. In this way, in the image deliberate regions of increased pixel resolution can be achieved by applying that/those modulation signal/s that is/are associated with the ROI detected by the gaze tracker.

The inventive display apparatus displays image content in the user's ROI with a pixel resolution as high as the regions of high local density of the beam trajectory allow. Image areas outside of the ROI stay at a lower resolution corresponding to regions of low local density of the beam trajectory. The display apparatus automatically follows the user's gaze and shifts the best pixel resolution available in the image plane to the ROI detected by gaze tracker. In this way, an optimised display with high perceived pixel resolution can be achieved, without the need to increase the oscillation frequencies of the mirror.

In a further embodiment of the disclosed subject matter, the image processor is configured to receive a control signal from said at least one of the gaze tracker and the controller, wherein said control signal indicates a pixel read-out ratio to be used by the image processor when reading-out the pixels. This allows for a fast, straight-forward implementation of the image processor.

Alternatively or additionally, the display apparatus of the disclosed subject matter may comprise a renderer which renders the image frame before it is stored in the buffer, and this renderer may be configured to receive a control signal from said at least one of the gaze tracker and the controller, wherein said control signal indicates a rendering resolution to be used by the renderer when rendering the image frame. In this way, both processing power in the renderer for rendering as well as memory space in the buffer can be saved. The renderer needs to render only those parts of the image frame—and the buffer to hold only these parts—in high pixel resolution which are actually read-out by the image processor for regions of increased pixel resolution in the image plane, in particular for the ROI, whereas other parts of the image frame can be rendered and buffered in a lower pixel resolution.

In order to keep the region of increased pixel resolution, which is achieved by modulating the excitation signal/s, stable over successive image frames of a series of image frames, the frequency of the modulation signal/s is/are optionally a one-or morefold of the frame rate of that series.

Regions of increased pixel resolution may be accompanied by an unwanted increase in light intensity, which may lead to an unevenly lit image. To counter this effect, in a further embodiment of the disclosed subject matter the controller is configured to decrease the intensity of the light beam for pixels within a region of increased pixel resolution.

The excitation signal/s can be modulated in different ways, e.g., by amplitude, frequency, phase or pulsewidth modulation. For example, using a frequency modulation which periodically detunes the respective excitation signal from the resonance frequency of the mirror around the respective axis also periodically alters the amplitude of the mirror oscillation because of deviating from the case of resonance. In a further embodiment of the disclosed subject matter an amplitude modulation is used to directly manipulate the amplitude of the excitation signal/s.

The ROI detected by the gaze tracker can be a region within the image plane which is currently hit by the user's gaze. In a further embodiment of the disclosed subject matter, however, the gaze tracker is configured to detect the ROI by predicting the ROI from an analysis of a past track of the user's gaze on the image plane. In this way, the display apparatus will pre-emptively adapt the region of increased pixel resolution to the user's ROI so that flickering effects are avoided even during phases of rapid movement of the user's gaze.

The point of gaze of the human eyes, in particular when reading a text, is usually not a smooth sweep, but a series of short stops (fixations) and quick movements (saccades). During a saccade, which usually takes 20-40 ms, the brain processes very little information. According to a further embodiment of the disclosed subject matter, the gaze tracker is configured to determine a duration of a past saccade of the user's gaze from the analysis of the gaze track and the controller is configured to complete a change of the modulation signal/s from one ROI to another ROI within that duration. This allows for an adaptation of the mirror oscillation from one state of the excitation signal/s to another, which state change is caused by the change of the modulation signal/s from one ROI to another, to occur nearly unnoticed.

The gaze tracker can be of any type known in the art. Unless the user's head is fixated or the display apparatus is head-mounted the direction of the user's gaze with respect to an image plane in the environment is a combination of the direction of the user's head with respect to the environment and the direction of the user's eyes with respect to the head. The direction of the user's head can, e.g., be detected by an inertial measurement unit (IMU) worn on the head, or visually by a camera, etc. The direction of the user's eyes with respect to the head can be measured by an eye tracker, e.g., on the principle of measuring the reflection of light on the cornea and/or retina or by a camera monitoring eye movements. In one embodiment of the disclosed subject matter, which is particularly suitable for AR or VR glasses, the display apparatus is configured to be head-mounted and the gaze tracker is an eye tracker.

The dependency of the modulation signal/s on the detected ROI can be given by an analytical formula programmed into the controller. However, in a practical implementation the controller may have a memory with a look-up table which stores, for each one of a set of different ROIs within the image plane, at least a respective first modulation signal dependent on that ROI, and the controller is configured to retrieve at least the first modulation signal dependent on the detected ROI from the look-up table. A look-up table allows for a fast real-time implementation with low processing needs and the use of pre-stored dependency functions found heuristically or by simulation.

Of course, all what has been said so far for modulating one of the two mirror excitation signals can be applied in much the same way for modulating both of the two excitation signals, each one with a separate modulation signal. Generally speaking, the controller is optionally configured to modulate the other one of the first and second excitation signals by a second modulation signal which is dependent on the ROI detected by the gaze tracker such that the number of passes of the light beam per unit area of the image plane and per frame period is higher in the ROI than in a region outside of the ROI. If the image frame is one of a series of images frames to be displayed on the image plane with a frame rate, the frequency of the second modulation signal is optionally a one-or morefold of the frame rate.

The first and second excitation signals can be modulated with different modulation signals which are entirely independent of each other and respectively change the region of increased pixel resolution independently in both dimensions across the image plane. Again, any sort of modulation can be used for the second excitation signal, e.g. a frequency, phase or pulsewidth modulation, optionally an amplitude modulation. If a look-up table in the memory of the controller is used, the look-up table may store, for each one of a set of different ROIs within the image plane, also a respective second modulation signal dependent on that ROI, and the controller is configured to retrieve also the second modulation signal dependent on the detected ROI from the look-up table.

Any modulation signal/s for the first and/or second excitation signals which does/do the job of shifting the region of increased pixel resolution into the ROI can be used. In a first variant, at least one of the first and second modulation signals is a triangular or saw-tooth signal with an offset, and the slopes of the saw-teeth or triangles and the offset depend on the detected ROI.

In a second variant of the disclosed subject matter, at least one of the first and second modulation signals is a sequence of sine halves with an offset, and the amplitudes of the sine halves and the offset depend on the detected ROI.

In a third variant, at least one of the first and second modulation signals is a repetition of a step-like function comprised of a first and a last section with high slope, a middle section with low slope, and an offset, wherein the respective slopes and lengths of the sections and the offset depend on the detected ROI.

In a fourth variant, at least one of the first and second modulation signals is a repetition of a step function comprised of at least two sections of different respective constant values, wherein the respective values and lengths of the sections depend on the detected ROI.

In any of the above embodiments the transition from the ROI of high pixel resolution and any neighbouring region of low pixel resolution can optionally be "smoothed" by interposing at least one intermediate region with an intermediate pixel resolution. To this end, according to a further optional feature of the disclosed subject matter the controller may be configured such that said number of passes, i.e. the number of passes of the light beam per unit area of the image plane and per frame period, is, in an intermediate region between the ROI and a region outside thereof, lower than in the ROI and higher than in said outside region; and the image processor is configured such that said number of pixels, i.e. the number of pixels read-out per unit area, is, in said intermediate region, lower than in the ROI and higher than in said region outside. In particular, several adjacent intermediate regions of gradually decreasing numbers of light beam passes and numbers of read-out pixels may be used, to better smooth the transition.

BRIEF DESCRIPTION OF THE DRAWINGS

The disclosed subject matter will now be described by means of exemplary embodiments thereof with reference to the enclosed drawings, in which show.

DETAILED DESCRIPTION

Figure 1:
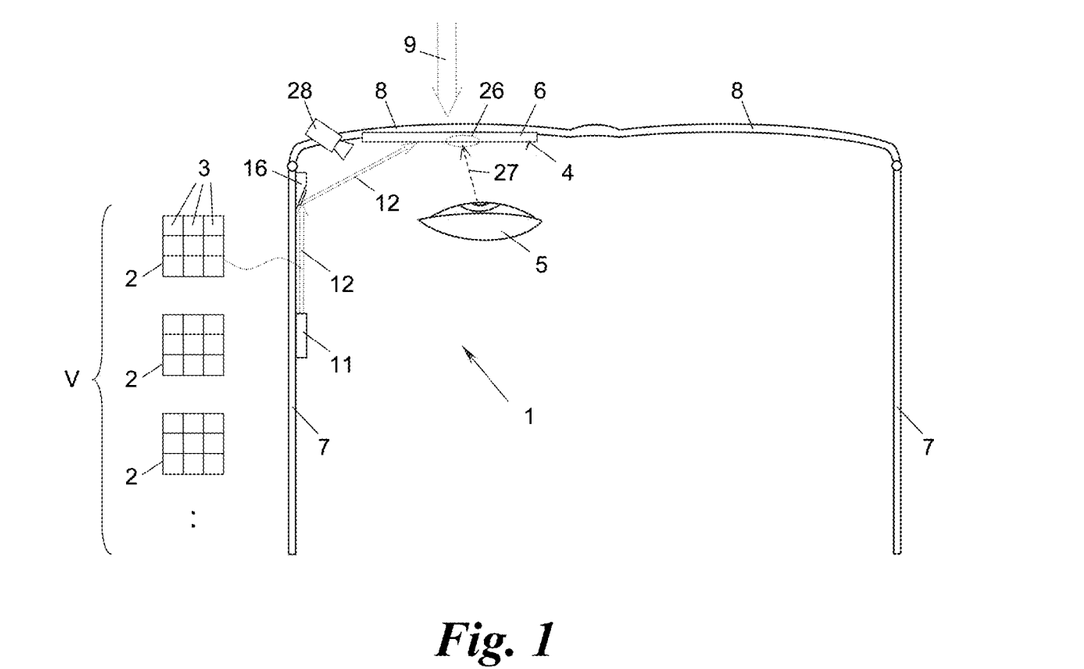
FIG. 1 the display apparatus of the disclosed subject matter built into a pair of AR glasses in a schematic top view.
Figure 3:
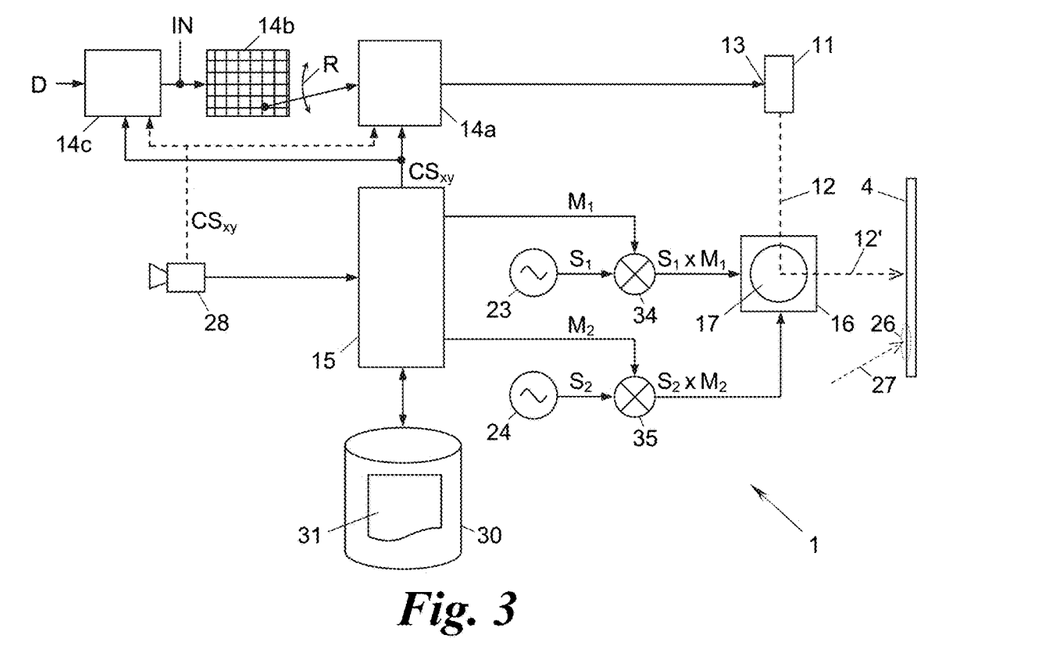
FIG. 3 the display apparatus of the disclosed subject matter in a circuit diagram.

FIGS. 1 and 3 show a display apparatus 1 for projecting a series V of successive image frames 2 (also called "images" or "frames" herein) each comprised of pixels 3 towards an image plane 4 in front of a user's eye 5 for a frame period $T_{fr}$. The image frames 2 follow one after another with a frame rate $f_{fr}=1/T_{fr}$ and can convey a static content, i.e., several successive image frames 2 show the same content, or an image content varying from frame to frame, such as in a video sequence.

Figure 12A:
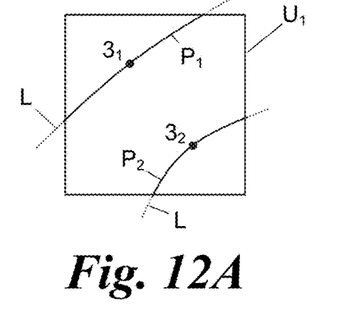
FIG. 12A and FIG. 12B the passes of the light beam across an exemplary unit area within the image plane during a frame period in a region of low pixel resolution (FIG. 12A) and a region of high pixel resolution (FIG. 12B)
Figure 12B:
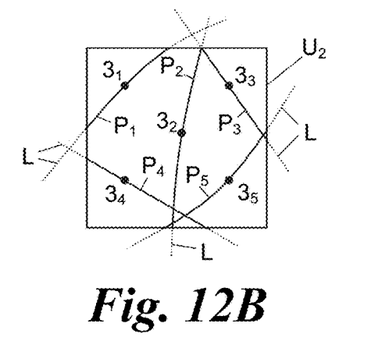
Figure 12C:
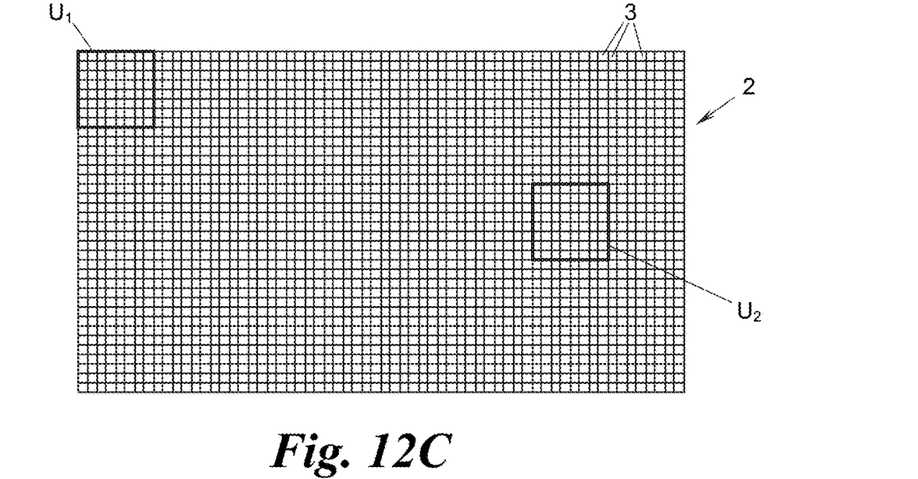
FIG. 12C an exemplary input image to be displayed by the display apparatus of the disclosed subject matter.

FIG. 12C is an example of one such image frame 2 fed to an input IN (FIG. 3) of the apparatus 1 for display. The image frame 2 may have a pixel resolution according to a conventional image or video standard, e.g., full HD (1920×1080 pixels), UHD (3840×2160 pixels), 4K (4096×2160 pixels) etc. As shown in FIG. 12C the pixel resolution of the input image frame 2 is usually uniform over the entire area of the image, i.e., the "local" pixel resolution, the number of pixels 3 per unit area U, for example 1 mm$^2$, 1 cm$^2$ or 1 square inch, is the same throughout the entire image frame 2. Two exemplary unit areas in different regions of the image frame 2 are designated in FIG. 12C with $U_1$ and $U_2$.

Reverting to FIG. 1 the image plane 4 is formed by a semi-transparent combiner 6 mounted on augmented reality (AR) glasses comprised of a spectacle frame with a pair of temples 7 and a pair of eye glasses 8. The semi-transparent combiner 6, e.g., a waveguide, a holographic or a freeform combiner, superposes the image frames 2 projected by the display apparatus 1 onto the image plane 4 with a light field 9 from a surrounding 10 so that the wearer of the AR glasses can see the image frames 2 or sequence V, respectively, overlaying ("augmenting") the surrounding 10.

In the example of FIG. 1, the display apparatus 1 (or two such apparatus 1, one per eye glass 8) is built into AR glasses and used in combination with a semi-transparent combiner 6. A similar application of the display apparatus 1 could be in an AR helmet worn by a user, a handheld AR device like a smartphone with a camera, or an AR head-up display (HUD) for a vehicle, which all may use a semi-transparent combiner 6 as the image plane 4. If desired, suitable waveguides, relay optics etc. can be interposed between the light display apparatus 1 and the semi-transparent combiner 6.

Instead of the semi-transparent combiner 6 the display apparatus 1 could be used with any other image plane 4, e.g., a conventional reflective projection screen such as a miniature screen mounted on the frame of virtual reality (VR) glasses, or a projection wall or a movie screen, for example when the display apparatus 1 is used as a miniature (or full-scale) video beamer. The display apparatus 1 could even be used to directly project the image frames 2 into the user's eye 5, i.e., use the retina of the eye 5 as image plane 4, optionally with suitable optics therebetween. It goes without saying that the image plane 4 can have any form, including a curved form such as the retina of the eye 5.

The display apparatus 1 comprises a light source 11 which emits a light beam 12. The light source 11 can be of any kind including gas lasers, fibre lasers, semiconductor lasers etc. For miniaturisation the light source 11 may employ LEDs, micro LEDs or laser diodes, e.g., edge-emitting laser diodes or surface-emitting laser diodes. For colour pixels 3, the light source 11 may be a polychromatic light source 11, e.g., a set of laser diodes of three primary colours which emit a light beam 12 comprised of three different wavelengths for colour perception. The light beam 12 carries the image frames 2 in a time-multiplexed manner, i.e., the intensity (luminance) and/or colour values of the pixels 3 one after the other in the sequence the pixels 3 are "painted" on the image plane 4, when the light beam 12 is moved along a trajectory over the image plane 4 as will be explained further on.

To control the intensity and/or colour of the light beam 12 pixelwise, the light source 11 has a control input 13 (FIG. 3) connected to an image processor 14a. The image processor 14a works under the control of a controller 15, as will be explained later on. The image processor 14a receives a stream of image data, e.g., the video sequence V of image frames 2 encoded according to a video standard, from the input IN via an image buffer 14b and controls the light source 11 according to the intensity and/or colour values of the pixels 3 encoded in the image data stream.

As the encoding of the pixels 3 in the image frames 2 is usually different from the order the pixels 3 are drawn by the light beam 12 on the image plane 4, the image processor 14a reads-out ("picks") the respective intensity and/or colour values for each pixel 3 in a random-access manner— schematically shown by arrow R—from the buffer 14b and applies them sequentially, i.e., in the drawing order of the pixels 3 along the light beam's trajectory on the image plane 4, to the input 13 of the light source 11.

To move (scan) the light beam 12 along its a trajectory over the image plane 4, the display apparatus 1 comprises a mirror assembly 16, here: one single micro-electro-mechanical-system (MEMS) mirror, downstream of the light source 11 in the path of the light beam 12. The mirror assembly 16 deflects the light beam 12 into subsequent directions (angles) towards the image plane 4. Optionally, additional optics or waveguides can be interposed in the path of the light beam 12 from the light source 11 via the mirror assembly 16 to the image plane 4.

Figure 2:
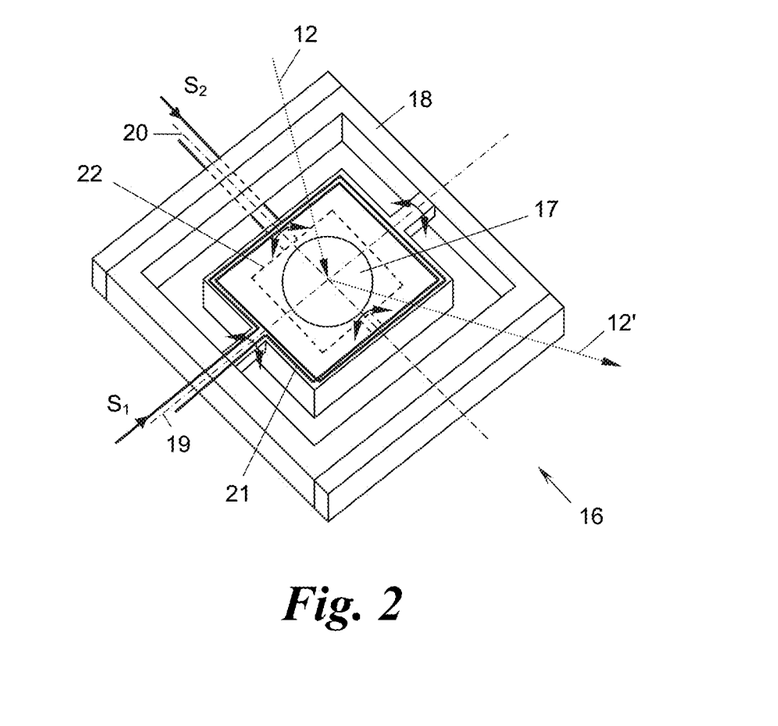
FIG. 2 the MEMS mirror of the display apparatus of FIG. 1 in a schematic perspective view.

As shown in FIG. 2, the mirror assembly 16 comprises a mirror 17 pivotably mounted in a support 18 for oscillation about two axes 19, 20. The axes 19, 20 are perpendicular to each other and lie within the plane of the mirror 17 when the mirror 17 is at rest. Other non-perpendicular directions of the two axes 19, 20 could be chosen, as long as they are not perpendicular to the plane of the mirror 17.

To induce the oscillation of the mirror 17 about the first axis 19 a first actuator 21 acts between the mirror 17 and the support 18. The actuator 21 may be a coil attached to the mirror 17 and lying in a magnetic field of the support 18, through which coil a first excitation signal $S_1$ (here: an excitation current) is passed. For inducing the oscillation of the mirror 17 about the second axis 20 a second actuator 22 acts between the mirror 17 and the support 18, e.g., also a coil, through which a second excitation signal $S_2$ is passed. The excitation signals $S_1$, $S_2$ are obtained from signal generators 23, 24 which may be external or internal to the display apparatus 1 and may be a part of the MEMS mirror 16 or the controller 14. Instead of electromagnetic actuators 21, 22 with coils any other type of actuators for driving the oscillations of the mirror 17 about the two axes 19, 20, can be used, e.g., electrostatic, piezoelectric, electrothermal or magnetostrictive actuators.

The frequencies $f_1$ and $f_2$ of the two excitation signals $S_1$ and $S_2$ are chosen such that the mirror 17 oscillates about each axis 19, 20 at—or nearly at—the resonance frequency of the respective articulation of the mirror 17 on the support 18 (or a multiple thereof, e.g., a harmonic frequency of higher order).

The resonance frequency or natural harmonics about the respective axis 19, 20 is defined by the mass distribution of the mirror 17 about that axis 19, 20, the spring forces and frictional resistances of the articulations of the mirror 17 about that axis 19, 20, and the magnetic, electrostatic, etc. counterforces of the actuators 21, 22. By oscillating the mirror 17 about the axes 19, 20 at—or in the vicinity of—its resonance frequency about the respective axis 19, 20 a large amplitude of the mirror movement (a large angular sway) can be achieved with small excitation signals $S_1$, $S_2$, i.e., of low power or low amplitude, which allows to use particularly small actuators with small moving masses and high resonance frequencies.

Figure 4A:
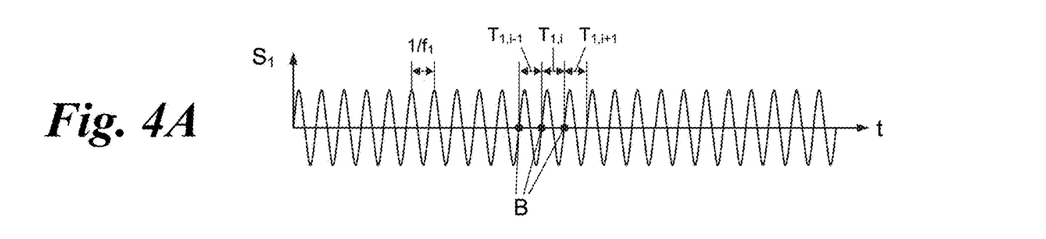
FIGS. 4A and 4B exemplary excitation signals for oscillating the mirror of FIG. 2 about its two axes of articulation.
Figure 4B:
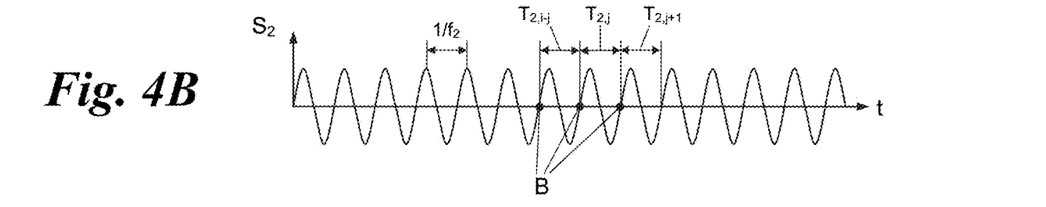

To excite and maintain the resonant oscillations of the mirror 17 about the axes 19, 20 the excitation signals $S_1$, $S_2$ can be of any form, e.g., pulse signals which trigger the mirror oscillations every oscillation period, every other oscillation period or even more seldomly. However, usually the frequencies $f_1$, $f_2$ of the excitation signals $S_1$, $S_2$ will be the same as the oscillation frequencies of the mirror 17 about the axes 19, 20. Most commonly sinusoidal excitation signal $S_1$, $S_2$ will be used, as shown in FIGS. 4A and 4B, but also excitation signals $S_1$, $S_2$ of other shapes are possible, e.g., of rectangular shape.

The frequencies $f_1$ and $f_2$ of the excitation signals $S_1$ and $S_2$ are chosen such that the trajectory of the light beam 12 on the image plane 4 is a Lissajous figure which densely covers the entire image plane 4 during the period $1/f_{fr}$ of one image frame 2. Such a "complex" or "dense" Lissajous figure can be achieved when the frequencies $f_1$, $f_2$ are greater than the frame rate $f_{fr}$, e.g., greater than 1 kHz or tens of kHz, and the beginnings B of their respective oscillation periods $T_i=1/f_1$, $T_j=1/f_2$ (i=1, 2, . . . ; j=1, 2, . . . ; see FIGS. 4A and 4B) meet only over every one or more frames 2, in particular when the frequencies $f_1$, $f_2$ are close to each other. To this end, integer frequencies $f_1$, $f_2$ with a small greatest common divisor, e.g. smaller than 10, may be employed, for example.

Alternatively, instead of the single mirror 17 oscillating about two axes 19, 20, the mirror assembly 16 could comprise two mirrors (not shown) each of which oscillates about a respective one of the (e.g. perpendicular) axes 19, 20 in dependence on the respective excitation signal $S_1$, $S_2$ for successive deflection of the light beam 12. Of course, any of the embodiments described herein may be carried out for this variant as well.

Figure 5A:
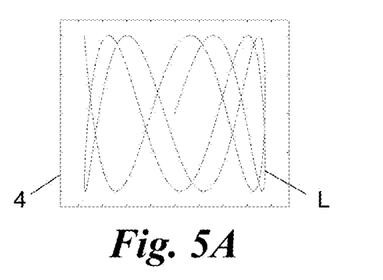
FIGS. 5A-5D four successive stages of the Lissajous trajectory of the light beam of the display apparatus of FIGS. 1-3 on the image plane when unmodulated sinusoidal excitation signals such as those of FIGS. 4A and 4B are employed.
Figure 5B:
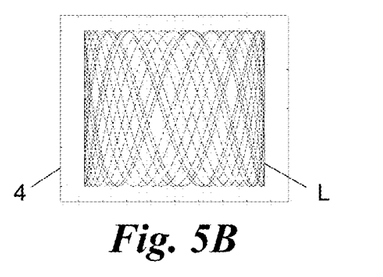
Figure 5C:
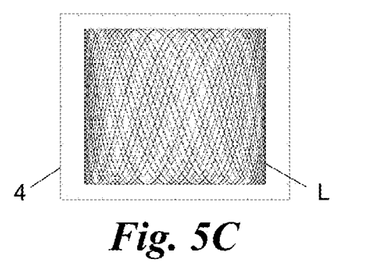
Figure 5D:
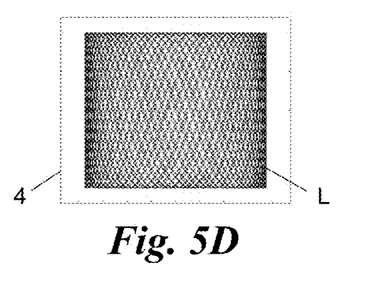
Figure 5E:
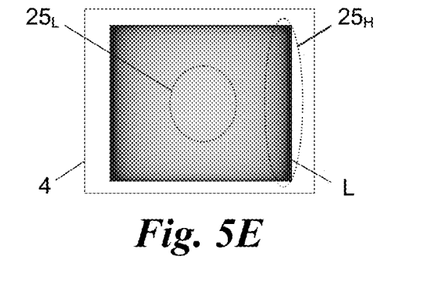
FIG. 5E the distribution of the pixel resolution over the image plane as a result of the finalised Lissajous trajectory of FIGS. 5A-5D, wherein dark grey represents a high pixel resolution and light grey represents a low pixel resolution.

FIGS. 5A-5E show the drawing of a dense Lissajous trajectory L by the light beam 12 on the image plane 4 in five successive stages. In the example of FIGS. 5A-5E, $f_1$ was 10003 Hz, $f_2$ was 35000 Hz, the resolution of the image plane 4 was 1152×864 pixels. FIGS. 5A-5D show four initial stages of drawing the Lissajous trajectory L, and FIG. 5E shows the resultant local pixel resolution achieved by the light beam 12 on the image plane 4, i.e., the local number of (geometrically differing) passes of the light beam 12 across a certain local unit area U of the image plane 4 during a certain time span of, e.g., $1/f_{fr}$. Each such different pass can be used to display at least one pixel 3 along the pass.

The local pixel resolution achievable by the number of differing passes of the light beam 12 per unit area U of the image plane 4 and per frame period $T_{fr}$ is depicted in FIG. 12A and FIG. 12B in more detail. FIG. 12A shows an exemplary unit area $U_1$ of the image plane 4 in a region $25_L$ of low pixel resolution (shown in light grey in FIG. 5E and in white in FIG. 12D) of the image plane 4. In this region $25_L$ the light beam 12 passes the unit area $U_1$ twice in two geometrically differing passes $P_1$, $P_2$ of its trajectory L. Along each pass $P_1$, $P_2$ the light sources 11 can be triggered by the image processor 14a (at least) once to display (at least) one pixel $3_1$, $3_2$ per pass $P_1$, $P_2$, i.e., in the frame period $T_{fr}$ currently considered the local pixel resolution $R_{xy}$ in each unit area U of the region $25_L$ is 2/U. Of course, each pass $P_1$, $P_2$ could also be used to display more than one pixel 3 along its extension by sequentially triggering the laser source 11 with subsequent pixels 3.

In FIG. 12B the light beam 12 passes an exemplary unit area $U_2$ in a region $25_H$ of the high pixel resolution (shown in dark grey in FIG. 5E and in light grey in FIG. 12D) five times, i.e., in five passes $P_1$-$P_5$ along its trajectory L. Each of the passes $P_1$-$P_5$ can be used to display (at least) one pixel $3_1$-$3_5$. In the example of FIG. 12B the local pixel resolution $R_{xy}$ is, in the frame period $T_{fr}$ currently considered, hence 5/U.

In the example shown in FIG. 5E dark grey represents a high local pixel resolution $R_{xy}$ of, e.g., 4000 pixels per square inch (4000 DPI) in an exemplary region $25_H$ at the periphery of the image plane 4, and light grey represents a low pixel resolution $R_{xy}$ of, e.g., 1000 pixels per square inch (1000 DPI) in an exemplary region $25_L$ in the middle of the image plane 4.

The amplitude of oscillations of the mirror 17 about the axes 19, 20 can be altered in different ways, for example, by changing the amplitude of the excitation signals $S_1$, $S_2$; by moving the frequencies $f_1$, $f_2$ of the excitation signals $S_1$, $S_2$ further away from the respective resonance frequency of the mirror 17 about the respective axis 19, 20, which leads to a drop of the oscillation amplitude from its maximum at resonance; by reducing the pulsewidth of a pulsed excitation signal $S_1$, $S_2$; etc. In general, the amplitude of the mirror oscillation about any of the two axes 19, 20 can be varied by amplitude modulation, frequency modulation, pulsewidth modulation or phase modulation of the respective excitation signal $S_1$, $S_2$ with a respective modulation signal $M_1$, $M_2$ generated by the controller 15.

Figure 7:
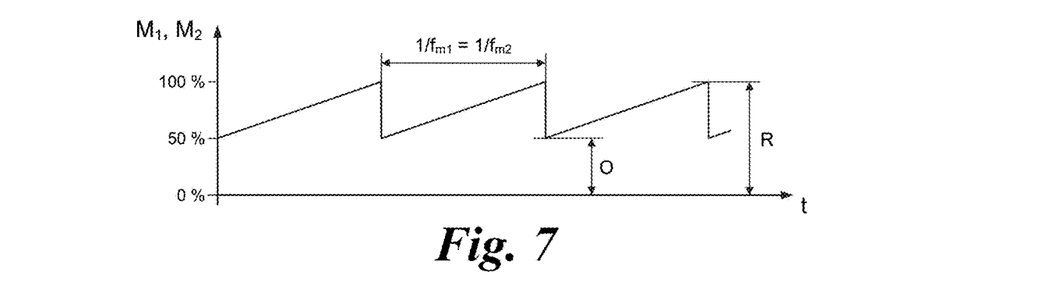
FIG. 7 an exemplary modulation signal for one or both of the excitation signals.

FIG. 7 shows an example of first and second modulation signals $M_1$, $M_2$ to be used to amplitude-modulate the first and second excitation signals $S_1$, $S_2$ of FIGS. 4A and 4B in form of a saw-tooth signal with a frequency $f_{m1}$, $f_{m2}$ equal to the one-or morefold of the frame rate $f_{fr}$ and an offset O of about 50% of the entire amplitude modulation range R of 100%.

Figure 6A:
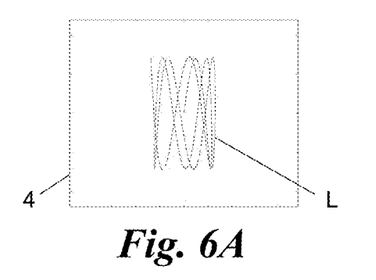
FIGS. 6A-6D four successive stages of the Lissajous trajectory of the light beam of the display apparatus of FIGS. 1-3 on the image plane when sinusoidal excitation signals, amplitude-modulated with the modulation signal of FIG. 7, are employed.
Figure 6B:
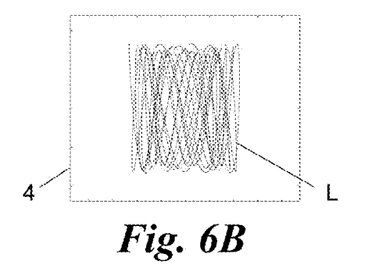
Figure 6C:
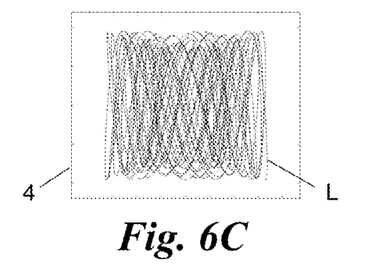
Figure 6D:
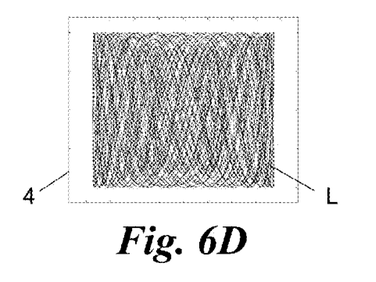
Figure 6E:
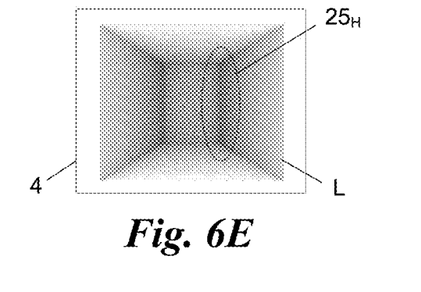
FIG. 6E the distribution of the pixel resolution over the image plane as a result of the finalised Lissajous trajectory of FIGS. 6A-6D, wherein dark grey represents a high pixel resolution and light grey represents a low pixel resolution.

By varying the amplitude of the oscillations of the mirror 17 about the two axes 19, 20 and hence the current maximum size of the trajectory L while it is drawn to "build-up" a frame 2, as it is shown in FIGS. 6A-6D, the local "density" of the finalised trajectory L on the image plane 4 can be altered by the controller 15 in such a way that areas $25_H$ in the image plane 4 with a high pixel resolution $R_{xy}$ (FIG. 5E) can be achieved at different locations in the image plane 4, see FIG. 6E. To this end, the controller 15 not only generates the modulation signals $M_1$, $M_2$ to achieve the higher density of the trajectory L in the areas 25, i.e., the higher number of passes $P_1$-$P_5$ of the light beam 12 per unit area U and per frame period $T_{fr}$ in these areas $25_H$ as shown in FIG. 12B, but concomitantly orders the image processor 14a to read-out a correspondingly increased number of pixels 3 (in the example of FIG. 12B: the pixels $3_1$-$3_5$) from the image buffer 14b so that the number of pixels 3 per unit area U and per frame period $T_{fr}$ is higher in the area $25_H$. Generally speaking, the number of pixels 3 per unit area U and per frame period $T_{fr}$ read-out from the buffer 14b by the image processor 14a (the "pixel read-out ratio") corresponds to the local density of the trajectory L, i.e., to the number of geometrically different passes P of the light beam 12 per frame period $T_{fr}$ and per local unit area U at the respective location xy within the image plane 4, in order to achieve the respective local pixel resolution $R_{xy}$.

Therefore, for a specific area $25_H$ of high pixel resolution $R_{xy}$ to achieve, the controller 15 calculates—in addition to specific modulation signals $M_1$, $M_2$ for the excitation signals $S_1$, $S_2$—a respective control signal $CS_{xy}$ to control the pixel read-out ratio of the image processor 14a. The control signal $CS_{xy}$ indicates the number of pixels 3 the image processor 14a reads out from the image buffer 14b per local unit area U of the image plane 4 and per frame period $T_{fr}$. This is shown in detail in FIGS. 12C and 12D.

Figure 12D:
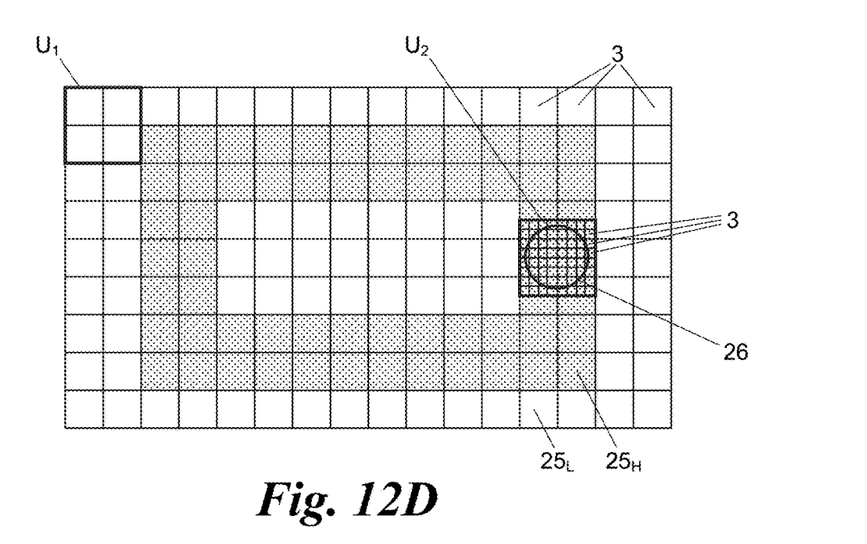
FIG. 12D an exemplary output image displayed by the display apparatus of the disclosed subject matter with an increased pixel resolution in the ROI.

As shown in FIG. 12C, an image frame 2 may be input into and stored in the image buffer 14b in its highest resolution available, e.g., in a regular 4K resolution all over the image. The control signals $CS_{xy}$ indicates a ratio of local "subsampling" of pixels per unit area U and per frame period $T_{fr}$ when reading the intensity and/or colour values of the pixels 3 out from the buffer 14b and outputting them to the input 13 of the light source 11. For example, in a region $25_H$ of high pixel resolution $R_{xy}$ the control signal $CS_{xy}$ orders no subsampling (pixel read-out ratio is 1:1), whereas in a region $25_L$ outside of the region $25_H$ the control signal $CS_{xy}$ orders subsampling. When subsampling in the region $25_L$, e.g., from any local group of 2×2, 4×4, 8×8, 16×16 etc. pixels 3, only one pixel 3 is read-out by the image processor 14a from the image buffer 14b and applied to the light source 11. This subsampling may optionally involve an averaging so that the pixel read-out ("picked") by the image processor 14a from a local group of pixels 3 is a weighted or unweighted average value of the (colour and/or intensity values of the) pixels 3 of that group and/or one or more neighbouring groups. FIG. 12D shows an example of a pixel read-out ratio (subsampling) of 16:1 in the region $25_L$ outside of the region $25_H$.

Alternatively, the image buffer $14_b$ may hold the image frame 2 already in a locally varying resolution according to the regions $25_L$ and $25_H$. This means that the image frame 2 is only generated in high resolution for the region $25_H$ (or at least the ROI 26) by, e.g., a renderer 14c which renders the image frame 2 from, e.g., abstract object data D such as 3D models, 3D animations etc. For the region $25_L$ (or any region outside of the ROI 26) the renderer 14c may render the image frame/s 2 in a reduced pixel resolution, saving both processing power in the renderer 14c and memory space in the buffer 14b. The information, which parts of the image frame/s 2 shall be rendered in high or low resolution, is fed to the renderer 14c in form of the control signal $CS_{xy}$ by the processor 15.

To further save processing power in the renderer 14c, the renderer 14c may even abstain from rendering the image frame/s 2 in high resolution for those areas within the regions $25_H$ which are not currently used for the ROI 26, see grey pixels 3 in the region $25_H$ outside of the ROI 26 in FIG. 12D.

The above-mentioned modulation of the excitation signals $S_1$, $S_2$ by the modulation signals $M_1$, $M_2$ is now selectively used in the display apparatus 1 to increase the local pixel resolution $R_{xy}$ in a user's region of interest, ROI, 26 (FIGS. 1, 3) on the image plane 4 identified by a user's gaze 27, i.e., to shift the region $25_H$ of increased pixel resolution to where the user looks to on the image plane 4 with his or her eyes 5. To this end, the display apparatus 1 comprises a gaze tracker 28 which tracks the user's gaze 27 and, from an analysis of the gaze 27, detects the user's ROI 26 on the image plane 4. The gaze tracker 28 is connected to the controller 15. Instead of the controller 15 issuing the control signal $CS_{xy}$ to the image processor 14a (and optionally the renderer 14c), the control signal $CS_{xy}$ could also be generated directly by the gaze tracker 28 and fed to the image processor 14a (and optionally the renderer 14c), see the connection depicted in broken lines in FIG. 3, or even within the image processor 14a and/or the renderer 14c itself.

In the head-mounted embodiment of the display apparatus 1 shown in FIG. 1, the gaze tracker 28 is an eye tracker, as it is sufficient to track a movement of the user's eyes 5 with respect to the head-mounted image plane 4 formed by the transparent combiner 6. If, however, the image plane 4 is not head-mounted (and the user's head not stationary), the gaze tracker 28 needs to track both the movement of the user's head with respect to the image plane 4 as well as the movement of the user's eyes 5 with respect to the head in order to track the gaze 27 and detect the ROI 26 correctly.

Parts of the gaze detector 28, in particular its processing components, may be implemented by the controller 15 and/or the image processor 14a. In general, the controller 15, the image processor 14a, the image buffer 14b, the optional renderer 14c and the gaze tracker 28 may be implemented individually by separate electronic components or integrated into each other as needed, i.e., share common electronic components.

The gaze tracker 28 can work according to any principle known in the art, e.g., by eye-attached tracking with special contact lenses worn by the user which have embedded mirrors or sensors, or by optical tracking of corneal or retinal reflections of visible or invisible light rays. Most commonly, the gaze trackers 28 will be implemented optically, e.g., by means of a camera directed at the user's eye or eyes to view and track the gaze 27. Such a video camera can be used both for eye tracking (when head-mounted) or gaze tracking from a stationary point in the environment 10 when it views and analyses both eye movement and head movement.

The detection of the user's ROI 26 on the image plane 4 is used to move the area $25_H$ of increased pixel resolution $R_{xy}$, achieved by the current modulation of the excitation signals $S_1$, $S_2$ applied and the current pixel read-out ratio of the image processor 14a, into the detected ROI 26. This is shown in FIGS. 8A and 12D.

Figure 8A:
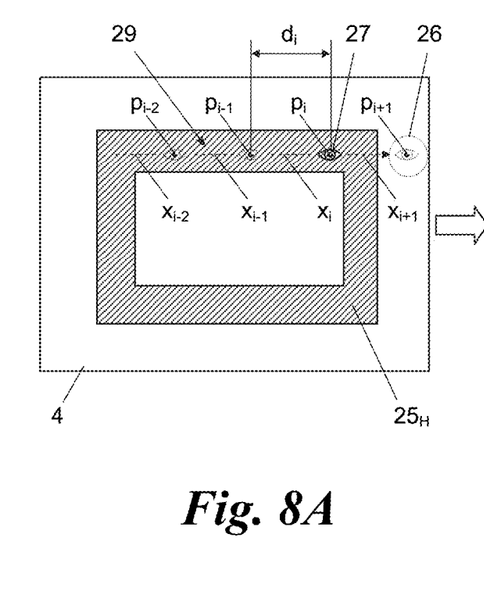
FIGS. 8A and 8B the mode of operation of the gaze tracker of the display apparatus of FIGS. 1-3 and an adaptation of a region of increased pixel resolution on the image plane in dependence on the ROI detected by the gaze tracker in two successive stages.
Figure 8B:
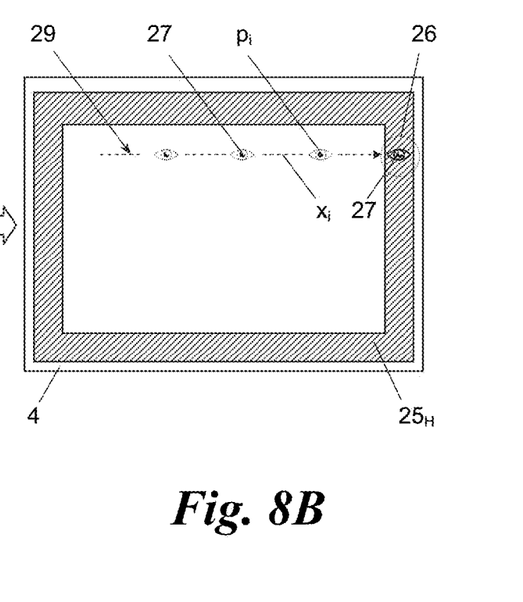

In a first variant shown in FIGS. 8B and 12D when considered without FIG. 8A, the gaze detector 28 detects the current ROI 26 by analysing the gaze 27 on the image plane 4 and feeds this information to the controller 15 and optionally to the image processor 14a. The controller 15 is configured to calculate or choose the modulation signal/s $M_1$, $M_2$ in dependency on the detected ROI 26 so that the region $25_H$ of increased pixel resolution $R_{xy}$ falls into or covers the detected ROI 26 as good as possible. At the same time the image processor 14a is configured to choose its pixel read-out ratio from the buffer 14b—and optionally the renderer 14c its local rendering resolution—according to the control signal $CS_{xy}$ received from the gaze tracker 28 and/or the controller 15.

As can be seen from FIG. 8B, the region $25_H$ of increased pixel resolution $R_{xy}$ may be symmetrical about two axes of the image plane 4, i.e., look like a "painting canvas frame" the size and width of which depends on the excitation and modulation signals $S_1$, $S_2$, $M_1$, $M_2$ used. The region $25_H$ may thus be significantly greater than the ROI 26.

In a second variant shown by the sequence of FIGS. 8Aa and 8B in combination with FIG. 12D, the gaze tracker 28 analyses a past track 29 of the user's gaze 27 on the image plane 4, for example a sequence of fixations $p_1$, $p_2$, ..., generally $p_i$, with saccades $x_1$, $x_2$, ..., generally $x_i$, therebetween. Such a track 29 of alternating fixations $p_i$ and saccades $x_i$ occurs, for example, when a user reads a line of text displayed by the display apparatus 1. In other circumstances, e.g., when the user fixates a moving object in the environment 10, the track 29 may be a smooth slow sweep without any fixations or saccades.

From an analysis of the past track 29 of the gaze 27 the gaze tracker 28 can then predict the current ROI 26 for a frame 2 to display, and the controller 15 can—even pre-emptively—change the modulation signals $M_1$, $M_2$ so that the ROI 26 will always be hit or covered by a region 25 of increased pixel resolution $R_{xy}$. Concurrently, the corresponding control signal $CS_{xy}$ is issued by the gaze tracker 28 or the controller 15 to the image processor 14a and optionally the renderer 14c. The gaze tracker 28 can even predict a next saccade $x_{i+1}$ from an analysis of the track 29, particularly from a past sequence of fixations $p_i$ and saccades $x_i$, in order to adjust the display apparatus 1 for the next saccade $x_{i+1}$ of the user's gaze 27.

When predicting the ROI 26, the gaze tracker 28 can not only predict the location of the ROI 26 but optionally also the size of the ROI 26. For instance, the size of the ROI 26 can be determined in dependence on a calculated location prediction uncertainty, e.g., in order to have a larger size of the ROI 26 in case of a higher location prediction uncertainty.

Furthermore, the gaze tracker 28 can be configured to determine a duration (or average duration) $d_i$ of one (or more) past saccades $x_i$, and the controller 15 can be configured to complete a change from a first set of modulation signals $M_1$, $M_2$—which achieves, e.g., the region $25_H$ of FIG. 8A—to a second set of modulation signals $M_1$, $M_2$—which achieves, e.g., the region $25_H$ of FIG. 8B—within that duration $d_i$. A corresponding change from a first control signal $CS_{xy}$ to a second control signal $CS_{xy}$ is made by the gaze tracker 28 or controller 15 to instruct the image processor 14a and optionally the renderer 14c to complete the pixel read-out ratio change and the optional rendering resolution change within the duration $d_i$. As the brain processes hardly any visual information during a saccade, the adjusting of the display apparatus 1 to a new set of modulation signals $M_1$, $M_2$ and corresponding control signal $CS_{xy}$ will happen unnoticed. The modulation signals $M_1$, $M_2$ and control signals $CS_{xy}$ required to achieve a specific region $25_H$ of increased pixel resolution $R_{xy}$ that hits or covers the ROI 26, i.e., the dependencies of the signals $M_1$, $M_2$, $CS_{xy}$ on the detected ROI 26, can be programmed into the controller 15 (and/or the gaze tracker 28 and/or the image processor 14a and/or the renderer 14c) in form of a formula. Alternatively, as shown in FIG. 3, the controller 15 has a memory 30 which stores a look-up table 31 for the dependencies (associations) between different possible ROIs 26—e.g., grouped according to regions 25 into which they fall—and respective first and second modulation signals $M_1$, $M_2$.

Figure 9:
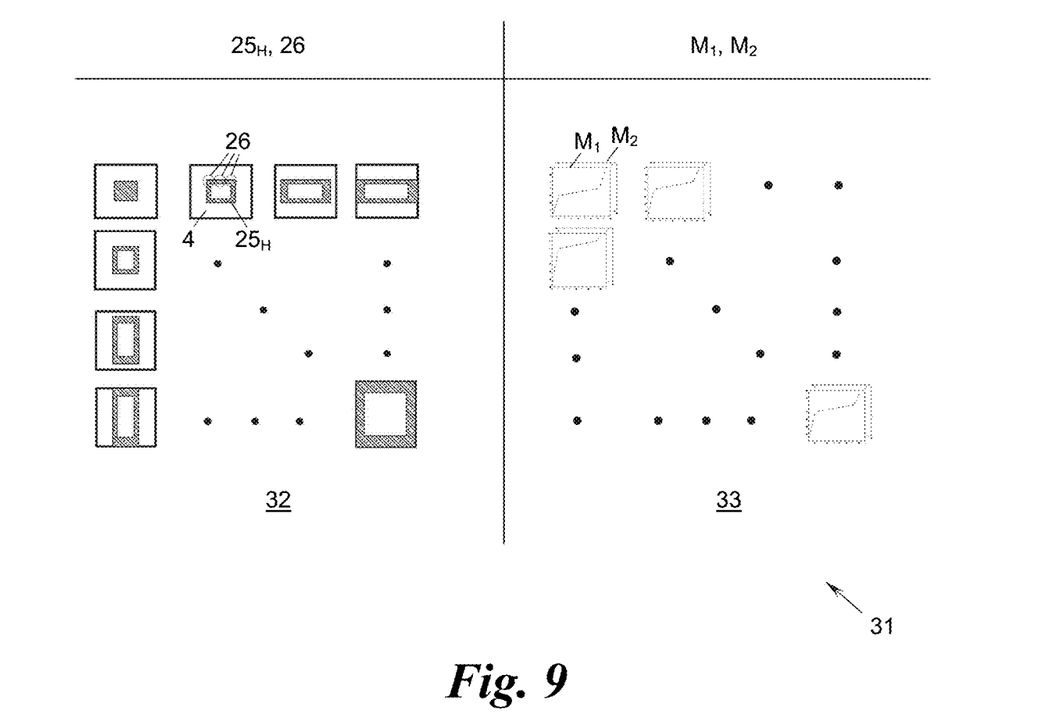
FIG. 9 an exemplary look-up table in the memory of the controller of the display apparatus of FIGS. 1-3.

FIG. 9 shows an example of such a look-up table 31 in the memory 30 of the controller 15 in form of two matrices 32, 33, one matrix 32 for a set of different regions 25 of increased pixel resolution $R_{xy}$ which each cover a set of possible ROIs 26 and another matrix 33 for a set of different pairs of first and second modulation signals $M_1$, $M_2$. Each modulation signal $M_1$, $M_2$ is identified by the shape of the modulation signal within one period $1/f_{m1}$, $1/f_{m2}$ of the modulation signal, to be repeated over time t. Each pair of modulation signals $M_1$, $M_2$, i.e., each element of the matrix 33, corresponds to one region 25 of increased pixel resolution $R_{xy}$ achievable with that pair of modulation signals $M_1$, $M_2$, i.e., to one respective element of the matrix 32.

For a specific ROI 26 detected, the controller 15 looks up the region $25_H$ into which the ROI 26 falls (or which falls into that ROI 26) and retrieves from the correspondence between the elements of the matrices 32, 33 the corresponding first and second modulation signals $M_1$, $M_2$. The controller 15 then modulates the excitation signals $S_1$, $S_2$ with the modulation signals $M_1$, $M_2$ retrieved from the look-up table 31. Concurrently, the controller 15 (or the gaze tracker 28) controls the image processor 14a—and optionally the renderer 14c—such that the number of pixels 3 read-out per unit area U by the image processor 14a is correspondingly higher in the ROI 26 than outside of the ROI 26.

The corresponding control signal $CS_{xy}$ can instruct the image processor 14a to perform the reduced subsampling or non-subsampling—and optionally the renderer 14c to perform its full-resolution rendering—in the entire region $25_H$ or only in the ROI 26. The control signal $CS_{xy}$ may, e.g., be a first predefined pixel read-out ratio and/or rendering resolution for the region $25_H$ or ROI 26 and a second predefined pixel read-out ratio and/or rendering resolution for the region $25_L$. When generated by the controller 15, each corresponding control signal $CS_{xy}$ may be stored in the look-up table 31 together with the respective modulation signals $M_1$, $M_2$.

To perform the modulation, the display apparatus 1 may have discrete modulators 34, 35 receiving the excitation signals $S_1$, $S_2$ from the signal generators 23, 24 on the one hand and the modulation signals $M_1$, $M_2$ from the controller 15 on the other hand. Alternatively, the signal generators 23, 24 and modulators 34, 35 can be implemented by processing elements within the controller 15.

In general, different types of modulation signals $M_1$, $M_2$, can be used which lead to different shapes and sizes of regions 25 of increased pixel resolution $R_{xy}$. Instead of the saw-tooth signals of FIG. 7, triangular signals with an offset could be used as modulation signals $M_1$, $M_2$, wherein the slopes of the triangles and the offset depend on the detected ROI 26 to be hit or covered by the region $25_H$. FIGS. 10A-10E show further examples of useful modulations signals $M_1$, $M_2$ which lead to the different distributions of the pixel resolution $R_{xy}$ over the image plane 4 shown in FIGS. 11A-11E.

Figure 10A:
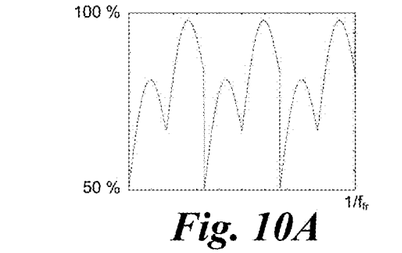
FIGS. 10A-10E five further exemplary embodiments of modulation signals for the excitation signals.
Figure 10B:
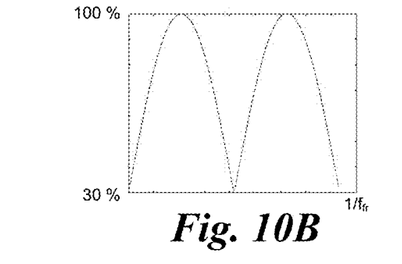

In FIG. 10A, the modulation signal $M_1$ or $M_2$ is a sequence of different sine halves per frame rate period $1/f_f$, with an offset of 50%. In FIG. 10B, the modulation signal $M_1$ or $M_2$ is a sequence of two similar sine halves with an offset of 30%.

Figure 10C:
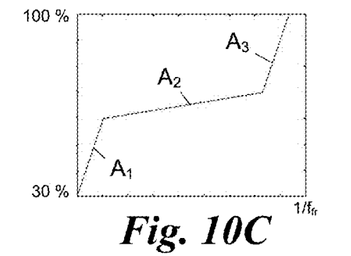
Figure 10D:
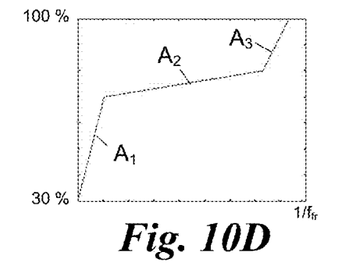
Figure 10E:
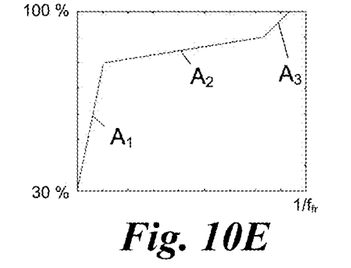
Figure 11A:
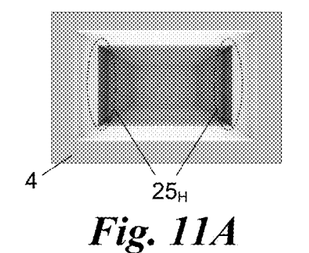
FIGS. 11A-11E respective five distributions of the pixel resolution over the image plane resulting from an amplitude-modulation of sinusoidal excitation signals with the modulation signals of FIGS. 10A-10E, respectively.
Figure 11B:
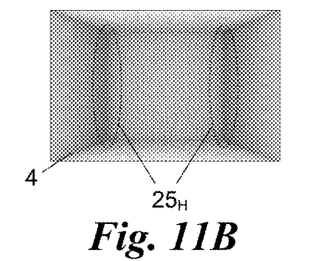
Figure 11C:
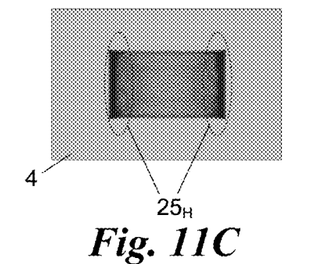
Figure 11D:
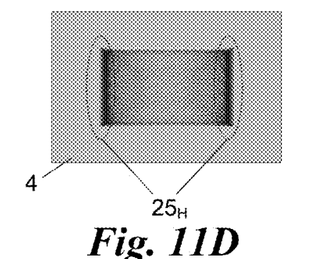
Figure 11E:
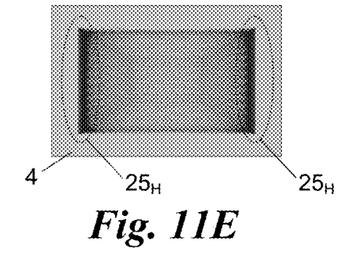

In FIGS. 10C-10E the modulation signal $M_1$ or $M_2$ is a step-like function comprised of a first section $A_1$ with high slope, a middle section $A_2$ with low slope, and a last section $A_3$ with high slope, and an offset of 30%. The respective slopes and lengths of the sections $A_1$, $A_2$, $A_3$ and the offset O each depend on the detected ROI 26 to cover with the region $25_H$ of increased pixel resolution $R_{xy}$ achieved with this sort of modulation.

In an optional variant (not shown), the modulation signal $M_1$ or $M_2$ is a repetition of a step function comprised of at least two sections of different respective constant values, wherein the respective values and lengths of the sections depend on the detected ROI 26. It goes with saying that each of the excitations signals $S_1$, $S_2$ can be modulated with the same or different modulation signals $M_1$, $M_2$, i.e., with modulation signals $M_1$, $M_2$ of different frequencies, shapes, amplitudes and offsets.

The region $25_H$ of increased pixel resolution and/or the ROI 26 may be perceived by the user with an increased light intensity. This may be a desirable effect if the attention of the user shall be particularly drawn to the region $25_H$ or the ROI 26, respectively. On the other hand, if this is an undesirable effect which shall be countered, the controller 15 can optionally decrease the intensity of the light beam 12 via the control input 13 of the light source 11 for pixels 3 within the region $25_H$, or at least within the ROI 26, and increase it outside thereof.

In a further optional variant multiple different regions $25_{H,i}$ (i=1, 2, . . . ) with respective different subsampling ratios may be used. This can be done, e.g., to "smooth" the transition of the pixel resolution between the ROI 26 and its surrounding, or between the areas $25_H$ and $25_L$, respectively, by using one or several adjacent "intermediate" regions $25_{H,i}$ of gradually decreasing pixel resolution until the pixel resolution has reached that of the neighbouring region $25_L$.

The disclosed subject matter is not restricted to the specific embodiments described herein, but encompasses all variants, modifications and combinations thereof that fall within the scope of the appended claims.

What is claimed is:

1. A display apparatus, comprising:
a mirror assembly, wherein a first mirror of the mirror assembly is configured to oscillate resonantly or near resonance about a first axis upon excitation by a first excitation signal of a first frequency and wherein the first or a second mirror of the mirror assembly is configured to oscillate resonantly or near resonance about a second axis upon excitation by a second excitation signal of a second frequency;
a light source configured to project a light beam onto the mirror assembly for deflection by the mirror assembly towards an image plane,
the light source having an input via which it can be controlled according to pixels of an image frame to be displayed on the image plane for a frame period, the pixels being read-out by an image processor from a buffer storing the image frame and applied sequentially to the input of the light source;
a gaze tracker configured to detect a user's region of interest, ROI, within the image plane by tracking a user's gaze; and
a controller connected to the gaze tracker and configured to modulate the first excitation signals by a first modulation signal and the second excitation signal by a second modulation signal, which first and second excitation signals are each dependent on the ROI detected by the gaze tracker such that the number of passes of the light beam per unit area of the image plane and per frame period is higher in the ROI than in a region outside of the ROI;
wherein the image processor is connected to at least one of the gaze tracker and the controller and configured to control the number of pixels read-out per unit area and per frame period such that said number of pixels is higher in the ROI than in a region outside of the ROI.

2. The display apparatus according to claim 1, wherein the image processor is configured to receive a control signal from said at least one of the gaze tracker and the controller, wherein said control signal indicates a pixel read-out ratio to be used by the image processor when reading-out the pixels.

3. The display apparatus according to claim 1, characterised by a renderer which renders the image frame before it is stored in the buffer, wherein the renderer is configured to receive a control signal from said at least one of the gaze tracker and the controller, and wherein said control signal indicates a rendering resolution to be used by the renderer when rendering the image frame.

4. The display apparatus according to claim 1, wherein the image frame is one of a series of image frames to be displayed on the image plane with a frame rate, and in that the frequency of the first modulation signal is a one-or morefold of the frame rate.

5. The display apparatus according to claim 1, wherein the controller is configured to decrease the intensity of the light beam for pixels within a region of increased pixel resolution.

6. The display apparatus according to claim 1, wherein the controller is configured to amplitude-modulate said one of the first and second excitation signals by the first modulation signal.

7. The display apparatus according to claim 1, wherein the gaze tracker is configured to detect the ROI by predicting the ROI from an analysis of a past track of the user's gaze on the image plane.

8. The display apparatus according to claim 7, wherein the gaze tracker is configured to determine a duration of a past saccade of the user's gaze from the analysis, wherein the controller is configured to complete a change of the first modulation signal from one ROI to another ROI within that duration.

9. The display apparatus according to claim 1, wherein the display apparatus is configured to be head-mounted and the gaze tracker is an eye tracker.

10. The display apparatus according to claim 1, wherein the controller has a memory with a look-up table which stores, for each one of a set of different ROIs within the image plane, a respective first modulation signal dependent on that ROI, wherein the controller is configured to retrieve the first modulation signal dependent on the detected ROI from the look-up table.

11. The display apparatus according to claim 1, wherein the image frame is one of a series of images frames to be displayed on the image plane with a frame rate, and in that the frequency of the second modulation signal is a one-or morefold of the frame rate.

12. The display apparatus according to claim 1, wherein the controller is configured to amplitude-modulate said other one of the first and second excitation signals by the second modulation signal.

13. The display apparatus according to claim 1,
wherein the look-up table stores, for each one of a set of different ROIs within the image area, a respective second modulation signal dependent on that ROI, wherein the controller is configured to retrieve also the second modulation signal dependent on the detected ROI from the look-up table.

14. The display apparatus according to 1, wherein at least one of the first and second modulation signals is a triangular or saw-tooth signal with an offset, wherein the slopes of the saw-teeth or triangles and the offset depend on the detected ROI.

15. The display apparatus according 1, wherein at least one of the first and second modulation signals is a sequence of sine halves with an offset, wherein the amplitudes of the sine halves and the offset depend on the detected ROI.

16. The display apparatus according to claim 1, wherein at least one of the first and second modulation signals is a repetition of a step-like function comprised of a first and a last section with high slope, a middle section with low slope, and an offset, wherein the respective slopes and lengths of the sections and the offset depend on the detected ROI.

17. The display apparatus according to 1, wherein at least one of the first and second modulation signals is a repetition of a step function comprised of at least two sections of different respective constant values, wherein the respective values and lengths of the sections depend on the detected ROI.

18. The display apparatus according to claim 1, wherein the controller is configured such that said number of passes is, in an intermediate region between the ROI and said region outside of the ROI, lower than in the ROI and higher than in said region outside, and in that the image processor is configured such that said number of pixels read-out is, in said intermediate region, lower than in the ROI and higher than in said region outside.

19. The display apparatus according to claim 18, wherein there are several adjacent intermediate regions of gradually decreasing numbers of passes and numbers of read-out pixels.

* * * * *